FIG. 7.

Sept. 18, 1945.   W. R. WICKERHAM   2,384,865
ALTERNATING CURRENT MOTOR CONTROL SYSTEM
Filed March 9, 1944    3 Sheets-Sheet 3

WITNESSES:

INVENTOR
William R. Wickerham.
BY
Paul E. Friedemann
ATTORNEY

Patented Sept. 18, 1945

2,384,865

UNITED STATES PATENT OFFICE 2,384,865

ALTERNATING CURRENT MOTOR CONTROL SYSTEM

William R. Wickerham, Swissvale, Pa., assignor to Westinghouse Electric Corporation, East Pittsburgh, Pa., a corporation of Pennsylvania Application March 9, 1944, Serial No. 525,629

22 Claims. (Cl. 172—152)

This invention relates to control systems for alternating-current motors, especially hoist motors, which involve the application of an unbalanced multiphase voltage to the primary motor terminals in order to obtain stabilized subsynchronous motor speeds especially during lowering performances of a hoist. Control systems of this type are also described in my copending applications Serial Nos. 513,351, 513,352 and 524,387.

It is an object of my invention to obtain with alternating-current motors a stabilized subsynchronous speed down to small fractions of the synchronous speed with the aid of control devices that are located outside the internal connections of the motor and hence permit using any customary motor, either delta or star connected, for this purpose.

Another object, allied to the foregoing, is to afford operating an alternating-current motor under multiphase torque conditions at high operating speeds while permitting a subsynchronous low speed operation at a greatly reduced or reversed torque, especially in a hoist control system when lowering an overhauling load.

Still another object, related to the foregoing, is to devise a control system for wound rotor hoist motors which permits lowering any load, within the full load range from zero to maximum, at any desired reduced, i. e. subsynchronous speed under stable operating conditions.

A further object of my invention is to afford in alternating-current motor controls an accurate slow inching operation under control by the operator.

An object is also to obtain a torque reversing control by voltage unbalancing means which operates automatically in dependence upon the motor speed.

It is also intended by this invention to provide means which produce an automatic reduction of the motor torque to a minimum or zero at a motor speed selected by the operator.

Another aim, subsidiary to any of the foregoing, is to achieve the above-stated objects by means of control devices which afford a torque reversal and are of simplified design as compared with the torque reversing voltage unbalance means disclosed in the above-mentioned copending application (W. E. Case 23 160).

These and other objects as well as the means provided by my invention for achieving them, will be apparent from the following description of the embodiments and diagrams illustrated in the drawings, in which:

Figure 1:
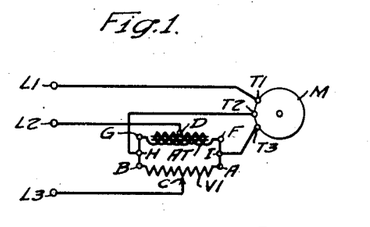
Figure 1 represents a circuit diagram of a motor control system according to the invention in one of its simplest forms under omission of the auxiliary contactors and other devices usually necessary in systems of this type.

Referring to Fig. 1 of the drawings, an alternating-current motor M of the induction type has its three field terminals T1, T2 and T3 connected with the terminals L1, L2, L3 of an alternating-current line which provides a balanced three-phase voltage having the phase rotation L1—L2—L3. Interposed between the motor terminals and the line terminals is a control network composed of an inductance device such as an autotransformer AT and a variable impedance device VI, preferably also of the inductive type. The transformer and the impedance device are connected in parallel and each has an intermediate point D or C connected with one of the line terminals L2 or L3. The points H and I between the transformer and the impedance device are connected to the motor terminals T2 and T3, respectively. The connection between terminals T1 and L1 is direct, i. e. neither of these terminals is connected with the just-mentioned control network.

It will be seen from the illustration that the impedance combination of AT and VI may be considered as a Wheatstone bridge whose input diagonal, between terminals D and C, is connected across the line terminals L2 and L3, while the output diagonal of the bridge, between points H and I is connected to the motor terminals T2 and T3. Assuming that point D is the voltage midpoint between the terminal points G and F of the transformer AT, and that the tap point C of device VI is also the voltage for impedance midpoint between points A and B, the bridge network is balanced. Consequently, no voltage drop appears between points H and I so that the motor terminals T2 and T3 have the same potential at any time during the alternating-current cycle. That is, when the bridge network is balanced, the voltage at the motor terminals has the maximum possible unbalance and produces single-phase field excitation with the effect that the motor torque is zero.

When either point C or D of the bridge arrangement is shifted, the bridge network becomes unbalanced. For instance, if point D remains fixed while the tap point C is shifted so as to coincide with point A, no impedance exists between line terminal L3 and the motor terminal T3. Hence T3 has the potential of L3, and the potential appearing at terminal T2 varies with a phase angle between that of the potentials at terminals T1 and T3. The motor M is energized by a three-phase voltage which, though still unbalanced, has the same phase rotation as the line voltage appearing at terminals L1, L2 and L3. As a result, the motor M develops a three-phase torque in the direction determined by the phase rotation of the line voltage.

If the tap point C is shifted so as to coincide with point B, the line terminal L3 is directly connected with motor terminal T2 and the potential at T3 lies between that of terminals L3 and L2 with respect to phase rotation. The motor is again energized by a three-phase voltage whose phase rotation is in the direction T1—T3—T2 and hence in opposition to that of the line voltage. Consequently, the motor develops a torque in opposition to that determined by the phase rotation of the line voltage.

It will be obvious from the foregoing explanation that if tap point C is placed anywhere between the illustrated balance point and one of the terminal points A and B, the unbalance of the voltage at the motor terminals is reduced to a corresponding extent so that any desired torque can be obtained between zero torque and a positive or negative maximum torque whose magnitude depends on the rating of the impedance network.

If point D is not placed in the voltage center of the transformer AT, the corresponding balance position of the reference point C lies also outside of the impedance center of device VI, so that the obtainable maximum torque in one direction of rotation is different from that in the other. In this manner the bridge network can be modified for different operating purposes. For instance, in certain cases of application a torque reversal is unnecessary so that it suffices if the control bridge is rated for varying the torque between two unidirectional limits. In hoist drives, for instance, a speed torque characteristic is desired for the lowering operation which permit obtaining high three-phase torques at high lowering speeds and a vanishing torque at zero speed. As will be shown hereinafter, the invention affords achieving such characteristics.

Figure 2:
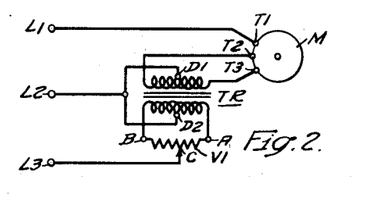
Fig. 2 shows the basic circuit diagram of a modified form of such a system.

The embodiment according to Fig. 2 is similar to that described in the foregoing except that the autotransformer AT is replaced by a transformer TR with two windings. The midpoints D1 and D2 of these windings are both connected to the line terminal L2. One of the windings is connected across the motor terminals T2 and T3 while the other winding lies in parallel to a variable impedance device VI whose tap C is connected to the line terminal L1. Since the two windings of the transformer are magnetically interlinked, the system operates in accordance with the principle of Fig. 1, as explained in the foregoing.

The control of the impedance variation of the device VI can be effected manually or by automatic means, or both. In one aspect of my invention and especially for obtaining multiphase torque at high speed and vanishing or reversing torque at low speeds, the control is rendered dependent upon the motor speed so that the motor torque is reduced or reversed at low motor speeds due to the above-mentioned function of the control network. In order to achieve this result, a control connection between the variable impedance device and the motor is provided. Such a connection is obtained in an especially favorable manner by designing the variable impedance devices as saturable reactors whose premagnetization is controlled by a source of variable voltage which, in turn, is controlled in response to the speed of the motor. An embodiment of this type is represented in Fig. 3.

Figure 3:
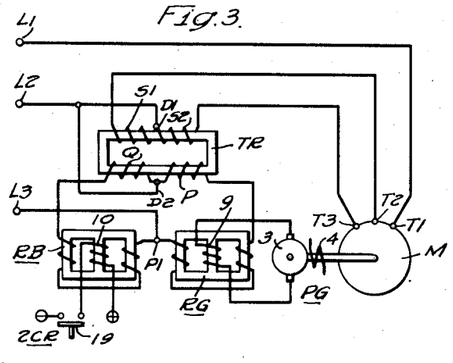
Fig. 3 represents a similar diagram of a different embodiment also involving the principles of the invention.

According to Fig. 3, the line terminals L1, L2 and L3 are connected to the motor terminals T1, T2, T3 through a control network which comprises a transformer TR in accordance with the one shown in Fig. 2. The two secondary winding sections forming the transformer midpoint D are denoted by S1 and S2. The two sections of the primary transformer winding, forming the midpoint D2, are denoted by P and Q. Windings P and Q are series connected with the reactance windings of two saturable reactors RG and RB which are provided with a premagnetizing control coil 9 and 10, respectively. Control winding 9 is connected to the armature 3 of a pilot generator PG which is driven by the motor M and produces a direct-current voltage in proportion to the motor speed. When the motor is at rest, the generator voltage is zero and hence the coil 9 deenergized. As a result, the reactor RG is magnetically unsaturated, so that impedance is a maximum. The control coil 10 of the reactor RB is connected to a direct-current source through a contact 19. As long as this contact is open, the reactor RB is unsaturated and has maximum impedance. When the contact 19 is closed, the available direct-current energization of coil 10 is sufficient to saturate the reactor in order to reduce its impedance to a minmium.

Figures 4, 5:
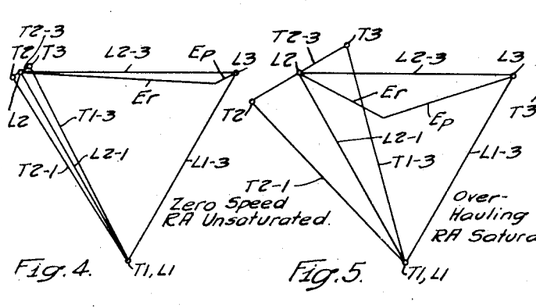
Figs. 4, 5 and 6 are explanatory vector diagrams typical of the voltage conditions in different control stages of a system according to Fig. 3.

Assuming the motor to be at rest, the supply of a balanced three-phase voltage to line terminals L1, L2 and L3, contact 19 being open, produces single phase excitation of the motor M so that no torque is produced. The voltage conditions then existing are represented by the vector diagram according to Fig. 4. In this figure, the points marked L1, L2, L3, T1, T2 and T3 denote the potentials of the corresponding terminals at a selected instant of a voltage cycle. The voltage across the reactor RG is denoted by Er and the voltage across the primary winding P by Ep. Due to the above described maximum unbalance of the voltage at terminals T1, T2 and T3, there is virtually no voltage drop between T2 and T3. This is indicated in Fig. 4, by the small magnitude of the voltage denoted by T2—3. The voltage T1—3 between terminals T1 and T3 is virtually identical with the voltage T2—1 between terminals T2 and T1. The voltage across terminals L1 and L2 is represented by vector L1—3 and the two other phase voltages at the line terminals are correspondingly represented by vectors L2—1 and L2—3. As stated previously, there is virtually no phase rotation at terminals T1, T2 and T3, so that no torque is developed.

When the motor M comes up to speed, for instance under an overhauling load, the pilot generator PG generates a correspondingly increasing voltage so that the reactor RG becomes progressively premagnetized and reduces its reactance while the reactance of reactor RB, contact 19 remaining open, remains at its maximum. Consequently, the balance of the bridge is disturbed and a three-phase energization, varying gradually towards its balance condition, appears at the motor terminals. The voltage conditions now set up in the system are exemplified by the vector diagram of Fig. 5, in which the reference characters have the same significance as in the above discussed diagram of Fig. 4. The voltage across the reactor RG denoted by Er has decreased as compared with the condition represented by Fig. 4 and the voltage Ep across the transformer winding P has increased. As a result, a voltage T2—3 of increasing magnitude appears between the motor terminals T2 and T3. The phase rotation of the motor voltage T1—T2—T3 is clockwise, i. e., in the same direction as the original phase rotation L1—L2—L3 of the line voltage. Hence, the motor develops torque in a corresponding direction.

Figure 6:
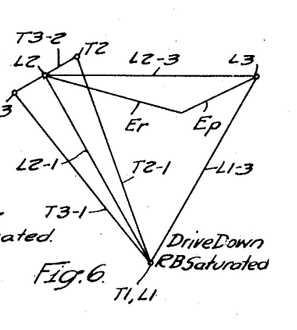

If the contact 19 is closed, thereby saturating the reactor RB, the reactance value of this reactor is substantially decreased. This corresponds, as to function, to a shifting of point C in Fig. 1 toward point B. That is, the ratio of the impedance values of the two voltage drops at either side of point P1 in Fig. 3 is changed and the bridge network correspondingly unbalanced. The voltage conditions now existing are exemplified by the vector diagram in Fig. 6. The voltage drop Er across reactor RG is reduced and the voltage across winding Ep increased as compared with the conditions represented by Fig. 4. As a result, a voltage difference T3—2 appears between terminals T2 and T3 of the motor. As shown in Fig. 6, the phase rotation T1—T2—T3 is counterclockwise, in opposition to the phase rotation L1—L2—L3 at the line terminals. Consequently, a torque is developed in opposition to that determined by the original phase rotation of the line voltage.

According to a further feature of my invention, a motor control system is so devised that the bridge type control network according to the principle explained in the foregoing is rendered operative only in selected stages of the control operation, while the control bridge is disconnected or otherwise rendered ineffective in other control stages where a balanced multiphase energization of the motor is preferable. Referring especially to alternating-current drives for cranes, elevators and other hoisting equipment, the invention is preferably applied in such a manner that the voltage-unbalancing control means are set for operation by means of the operator-actuated master controller and perform their torque controlling function during lowering operations. A system exemplifying these features is illustrated in Fig. 7.

Figure 7:
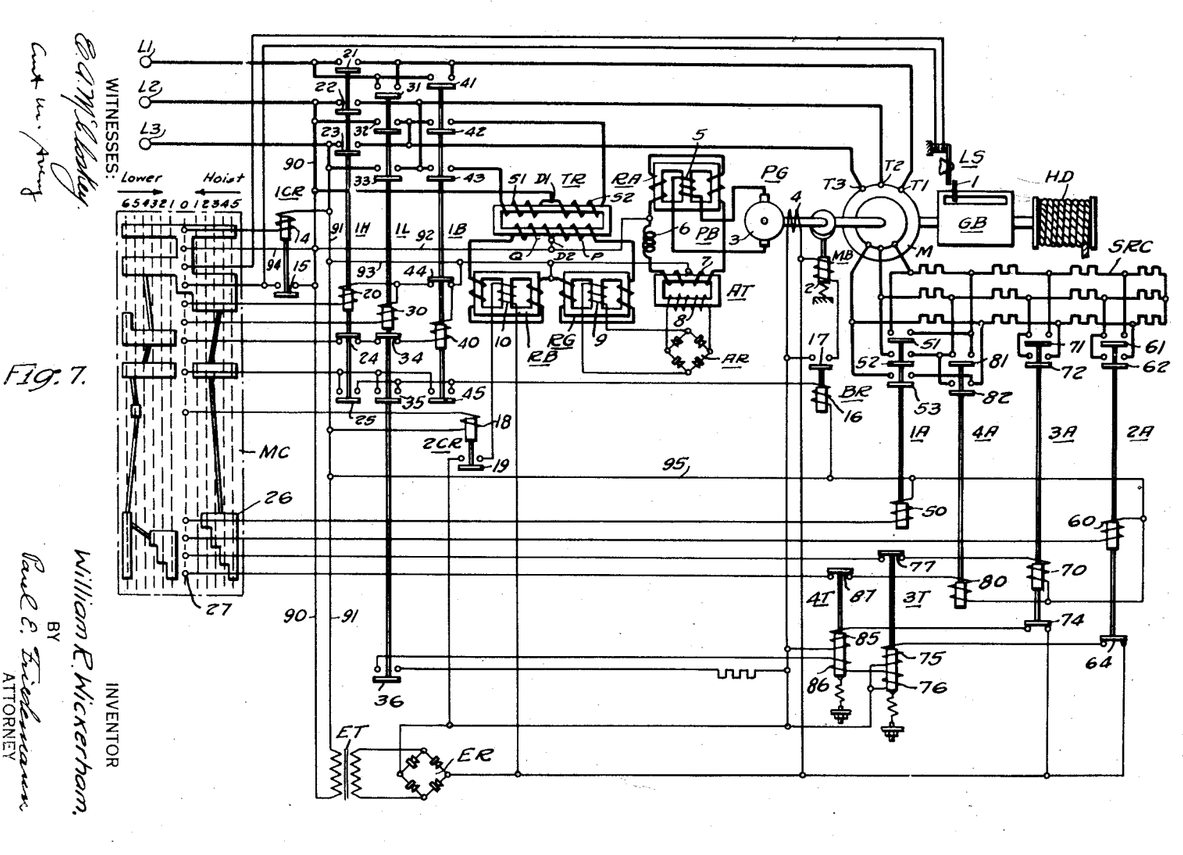
Fig. 7 is a complete circuit diagram of an alternating-current hoist drive designed in accordance with the invention and based on the principles elucidated by Figs. 3 through 6.

According to Fig. 7, a hoist motor M of the wound rotor type having a secondary resistance circuit SRC is connected with a gear box GB whose output shaft drives the hoist drum HD. The gear box has a travelling member 1 which opens the contact of a limit switch LS when the length of cable paid out by the drum HD exceeds a safe maximum. The drive is provided with a friction brake MB which is biased by a spring for operation and contains a magnet coil 2 for releasing the brake when energized. The armature 3 of a pilot generator PG is mounted on the motor shaft. The appertaining field winding 4, during the operation of the system, is energized by a constant direct-current voltage so that the output voltage of the generator is a measure of the motor speed.

The field terminals T1, T2, T3 of the hoist motor are connected with line terminals L1, L2, L3 under control by three line contactors 1H, 1L and 1B. A voltage unbalancing control network comprising a transformer TR, and two saturable reactors RG and RB is disposed between the line contactors and the motor terminals substantially in the same manner as shown in Fig. 3. The armature 3 of the pilot generator PG is connected to the network by means of an auxiliary bridge circuit PB which serves as an amplifier. The pilot bridge PB is composed of an auxiliary reactor AR of the saturable type whose premagnetizing coil 5 is connected across the generator armature. Hence, the reactor RA is unsaturated when the hoist drive is at rest and obtains an increasing excitation as the speed increases. The reactance of reactor RA changes accordingly, that is, the reactance value is a maximum at zero speed and decreases with increasing speed values. A reactor 6 of fixed reactance magnitude and a center-tapped primary winding 7 of a transformer AT are connected in series with reactor AR so as to form the four bridge branches of the network PB. The secondary 8 of transformer AT energizes a rectifier unit AR whose output terminals are connected to the control winding of the reactor RG. The bridge network PB is energized by alternating current which is supplied by leads 90 and 92 from line terminal L2. When the hoist drive and its pilot generator are at rest so that reactor RA has maximum impedance, the bridge PB is balanced so that no voltage is induced in the secondary winding 8. Consequently, the rectifier AR is ineffective, the control coil 9 deenergized and the reactor RG unsaturated in accordance with the conditions existing in the circuit of Fig. 3 at zero speed. When the pilot generator PG in Fig. 7 increases its speed, the bridge PB is increasingly unbalanced due to the fact that the reactor RA reduces its impedance while the reactor 6 retains its original impedance value. As a result, a voltage is induced in the secondary 8 of transformer AT and the control coil of reactor RG is energized and reduces the impedance of reactor RG. Hence, in this respect the control system operates also in accordance with the circuit of Fig. 3. However, since the pilot bridge PB is energized from the line, and since the pilot generator of Fig. 7 serves merely to produce a control effect for governing the output energy of the bridge, this energy is considerably greater than that generated by the pilot generator. The amplification thus obtained is especially favorable in heavy duty hoisting equipment, because it permits using a smaller pilot generator than that otherwise required. The addition of the pilot bridge PB has also the advantage of permitting one and the same type of pilot generator to be used for drives of low and high power rating by employing the pilot generator alone or in connection with a pilot bridge, respectively.

The circuit system for setting the motor and the just mentioned voltage unbalancing control means in accordance with the desired speed torque characteristic of the hoist drive, comprises a number of contactors and auxiliary devices which will be described presently.

A low voltage relay ICR has its control coil 14 traversed by current as long as the line terminals L1, L2, L3 are energized. The contact 15 of this relay serves to supply energization to most of the other relays so that the system is operative only when contact 15 is closed. When a voltage failure occurs, the energization of coil 14 becomes insufficient so that contact 15 is opened and the entire system set for stopping the motor and applying the brake MB.

The above-mentioned line contactor IH has a control coil 20 for actuating three main contacts 21, 22, 23 and two interlock contacts 24, 25. This contactor serves to connect the line terminals directly to the motor terminals in order to energize the motor M by a balanced three-phase voltage for developing three-phase torque in the hoisting direction. This contactor is actuated at all hoisting points of the master controller MC. This controller has an "off" position, five hoist positions and six lowering positions and is provided with contact segments, such as the one denoted by 26, and with cooperating contact fingers, such as the one denoted by 27. The segments are all in conductive connection with one another.

The line contactor IL has three main contacts 31, 32 and 33 and two interlock contacts 34, 35 controlled by a relay coil 30 which is energized only at point 6 lower of the master controller in order to connect the motor M directly to the line terminals with a reversed polarity so as to produce three-phase torque in the lowering direction.

The line contactor IB has three main contacts 41, 42, 43 and an interlock contact 45 controlled by a coil 40 which is energized at all 6 lowering points of the master controller and serves to connect the voltage unbalancing control means between the line terminals and the motor terminals. Hence the voltage unbalancing control means are in operation only during lowering performances and remain ineffective during all stages of a hoisting operation.

A brake relay BR, having a coil 16 and a contact 17, serves to energize coil 2 of brake MB in all hoist and lower positions of the master controller.

A contactor 2CR with a coil 18 and a contact 19 controls the energization of the demagnetizing coil 10 of reactor RB and corresponds to contactor 2CR and contact 19 in the circuit diagram of Fig. 3. It will be seen from Fig. 7 that relay 2CR is energized only at point 5 lower of the master controller.

An auxiliary transformer ET is connected through leads 90 and 91 across terminals L2 and L3 and energizes a rectifier unit ER which supplies constant excitation to coil 10 when contact 19 of relay 2CR is closed.

The secondary circuit SRC of motor M is controlled by four contactors denoted by 1A, 2A, 3A and 4A. Each of these contactors has a coil 50, 60, 70 and 80, respectively, energized through the master controller MC in selected stages of its hoisting and lowering positions. The contacts of contactor 1A are denoted by 51, 52 and 53. Those of contactors 2A, 3A and 4A are correspondingly indicated by 61, 62, 64 and 71, 72, 74 and 81, 82, respectively.

Two accelerating time relays 3T and 4T are provided in order to secure a proper timing interval between the sequential actuation of contactors 2A and 3A, and contactors 3A and 4A, respectively. Each of the timing relays 3T and 4T has a main coil 75, 85, an auxiliary or neutralizing coil 76, 86 and a contact 77, 87, respectively. The neutralizing coils 76 and 86 are energized from rectifier unit ER only when the contact 36 of line contactor IL is closed and have the effect of reducing the timing interval of the relays, for instance, from three quarters of a second to one half second. This occurs only at the sixth point lower of the master controller for driving down at high speed. In all other positions of the master controller, only the main coils 75 and 85 are energized from rectifier unit ER, provided the respective interlock contacts 64 and 74 of relays 2A and 3A are closed.

The operation of the system as a whole and the function performed by the voltage unbalancing control means will be more fully understood from the following description of complete hoisting and lowering operations.

When the line terminals L1, L2, L3 are energized, for instance, by the closure of a main switch (not illustrated), while the master controller MC is in its "off" position, the low voltage relay ICR is energized in circuit L2, 90, 94, MC, 14, 91, L3 and closes contact 15. The transformer ET is also energized so that rectifier unit ER provides excitation for the field winding 4 of the pilot generator PG and for the main coils 75 and 85 of timing relays 3T and 4T. Consequently, the timing relays open their respective contacts 77 and 87 immediately. The control network formed by transformer TR and reactors RB and RG is energized through leads 92 and 93, but since the pilot generator PG is at rest, the reactor RG is unsaturated and so is the reactor RB because contact 19 of relay 2CR is open. The closure of contact 15 completes a self-holding circuit for the low voltage relay ICR: L2, 90, 15, MC, 14, 91, L3. This circuit remains closed at all hoist and lower points of the master controller as long as no voltage failure occurs. In case of a voltage failure, contact 15 opens and can reclose only after the master controller is first placed into its "off" position.

Hoisting operation

Figure 8:
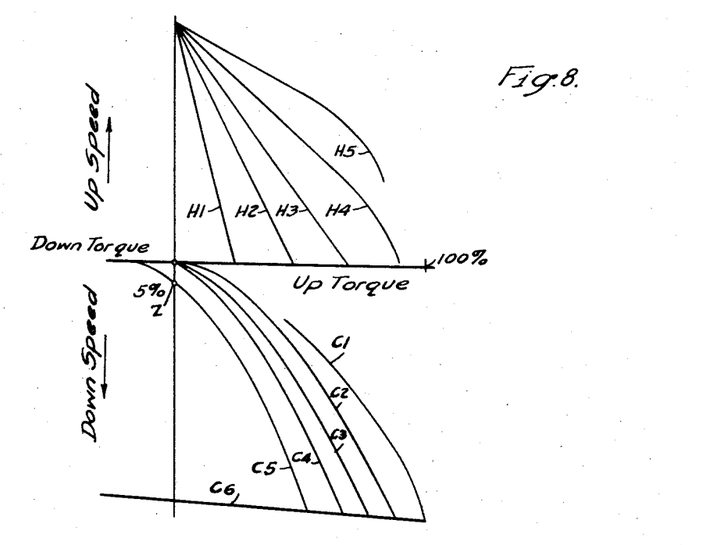
Fig. 8 is a diagrammatic showing of a family of speed torque characteristics typical of the operation of a system as represented by Fig. 7.

Point 1: When the master controller is moved from "off" to point 1 hoist, the line contactor IH picks up due to the energization of its coil 20 in circuit L2, 90, 15, MC, 20, 44, 93, 91, L3. Contacts 21, 22 and 23 close and connect the motor terminals T1, T2, T3 directly to the respective line terminals L1, L2, L3 for providing a balanced three-phase excitation in the hoisting direction of the motor. Interlock contact 24 of contactor IH opens and thereby prevents contactor IB from becoming energized. Contact 25 closes and energizes the brake relay BR so that the brake MB is released. All secondary relays IA, 2A, 3A and 4A remain deenergized. Consequently, all resistance sections of the secondary motor circuit SRC are effective. As a result, the motor is started in accordance with a speed torque characteristic as exemplified by curve H1 in the diagram of Fig. 8.

Point 2: When advancing the master controller to point 2 hoist, the above-mentioned control conditions are maintained, except that coil 50 of contactor IA is now energized through L3, 91, 95, 50, MC. Contacts 51, 52, and 53 close and short circuit one resistance section of circuit SRC. Consequently, the speed torque characteristic of the motor is changed as represented by curve H2 in Fig. 8.

Point 3: At third point hoist of the master controller the previous connections are maintained and the coil 60 of contactor 2A is also energized so that contacts 61 and 62 short another section of the secondary motor circuit with the result of obtaining a changed speed torque characteristic as exemplified by curve H3 in Fig. 8. Interlock contact 64 of contactor 2A opens the circuit of coil 75, so that the timing relay 3T drops off and closes its contact 77, thereby preparing a circuit for coil 70 of contactor 3A.

Point 4: In addition to the just mentioned conditions, the circuit of coil 70 is closed at MC. Contactor 3A closes contacts 71 and 72, thereby further reducing the resistance of the secondary motor circuit. The speed torque characteristic now prevailing is exemplified by curve H4 in Fig. 8. Interlock contact 74 of contactor 3A opens and disconnects coil 85 of timing relay 14, thereby causing it to close its contact 87 in preparation of an energizing circuit for coil 80 and contactor 4A.

Point 5: At the last point hoist of the master controller, the coil circuit of contactor 4A is closed at MC. Hence, this contactor closes contacts 81 and 82, thereby reducing the resistance in the secondary motor circuit to zero. The motor is now set for maximum speed torque conditions, for instance, as represented by curve H5 in Fig. 8.

*Lowering operation*

When moving the master controller from "off" to point I lower, line contactor IB picks up by energization of its coil 40 in circuit L3, 91, 93, 40, 34, 24, MC and closes contacts 41, 42, 43, thereby connecting the winding sections S1 and S2 of transformer TR to line terminals L2 and L3, while establishing a direct connection between terminals L1 and T1. As a result, a control circuit is established in accordance with the showing of Fig. 3, the contact 19 of relay 2CR remaining open. As a result the voltage balance control means are now ready for operation. The brake relay BR has its coil 16 energized through L3, 91, 95, 16, 45, MC and releases the brake MB. Contactor 2A comes in through MC, 60, 95, 91, L3 and opens contact 64 so that relay 3T drops off, thereby closing its contact 77. Contactor 3A picks up through MC, 77, 70, 95 and opens contact 74, so that relay 4T drops off and closes contact 87. Contactor 4A is energized through MC, 87, 80, 95. As a result, the resistance sections of circuit SRC controlled by contactors 2A, 3A and 4A are shorted.

As explained previously, the bridge circuit of transformer TR and reactor RG and RB is balanced as long as the motor is at rest, so that the excitation imposed on the motor terminals has single-phase characteristic and develops no torque in accordance with the vector diagram of Fig. 4. Under an overhauling load, the motor will accelerate, thereby causing the pilot generator PG to unbalance the transformer reactor network with the result of producing a three-phase energization and developing an increasing torque in accordance with the conditions represented by the vector diagram of Fig. 5. The polarity of the line connection established by contactor 41, 42 and 43 of contactor IB is such that the three-phase torque produced under control by the pilot generator is in the hoisting direction, and hence represents a countertorque relative to that developed by the load. A speed torque characteristic typical of these conditions is exemplified by curve C1 in Fig. 8.

Point 2: Upon passing from point I to second point lower, the previous control conditions are maintained except that coil 80 of contactor 4A is disconnected at MC. As a result, contacts 81 and 82 are opened and increase the resistance of circuit SRC. The change in the speed torque characteristic is represented by curve C2 in Fig. 8.

Point 3: At third point lower of the master controller, coil 70 of contactor 3A is disconnected at MC, so that contacts 71 and 72 open and thereby increase the resistance of circuit SRC to a further extent. The speed torque characteristic at this control step is exemplified by curve C3 in Fig. 8.

Point 4: Contactor 2A drops off because its coil 60 is disconnected at MC. This causes a further increase in resistance of the secondary circuit SRC, so that a speed torque characteristic is obtained as represented by curve C4 in Fig. 8. It will be noted that curves C1 through C4 are of the same typical shape. That is, the up-torque developed by the motor is high at high lowering speeds and decreases towards zero speed, the voltage unbalancing control means being so rated as to obtain vanishing torque at zero speed.

Point 5: The only change occurring when the master controller is further advanced to point 5 lower is the energization of coil 18. Relay 2CR closes its contact 19 and thereby places excitation on control coil 10 of reactor RB, thereby saturating the reactor and reducing its impedance to a minimum. The tendency of this change is to reverse the motor torque as explained previously and represented by the vector diagram of Fig. 6. Accordingly, when the motor speed is zero and the reactor RG unsaturated, a three-phase torque in the lowering direction is produced. As the motor M increases its speed, the voltage generated by the pilot generator causes an increasing premagnetization of reactor RG. Hence, the voltage unbalance at the motor terminals is also increased until, at a given percentage of motor speed of say 5%, the maximum voltage unbalance according to Fig. 4 is obtained. At this moment, the motor torque passes through the zero value (point Z in Fig. 8). At a further increase in motor speed, the torque is reversed and increases in the hoisting direction. A speed torque characteristic typical of the just mentioned operation is represented by curve C5 in Fig. 8. A characteristic of this type is desirable for light hook or zero load operation and permits an accurate inching or leveling performance.

Point 6: The last lowering point of the master controller is provided for permitting full speed lowering operations, especially with light or zero loads. At this control point, all secondary contactors 1A through 4A are energized at MC so that the resistance of the secondary motor circuit is completely shorted. Relay 2CR is disconnected so that the reactor RB assumes maximum impedance. Contactor IL picks up by energization of its coil 30 and closes contacts 31, 32 and 33 while disconnecting coil 40 of contactor IB so that the latter opens contacts 41, 42 and 43. As a result, the voltage applied to the motor terminals has the original phase rotation for producing a three-phase torque in the lowering direction. The speed torque conditions corresponding to this controller point are exemplified by curve C6 in Fig. 8.

Figure 9:
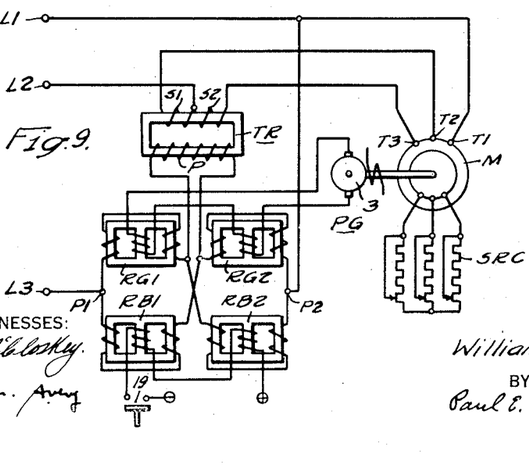
Fig. 9 is a diagram of still another modification of a motor control system in accordance with the invention.

In order to further elucidate the possibility of modifying the balance controlling network according to the invention, an embodiment of a control system is shown in Fig. 9, in which the transformer impedance combination is connected with all three-phase leads of the primary motor circuit. The illustration of the system is simplified in accordance with those shown in Figs. 1, 2 and 3, although it will be understood that additional control means of the type represented in Fig. 7 are as a rule required for applying the control principle.

According to Fig. 9, a transformer TR has the two sections S1 and S2 of its secondary winding connected across the motor terminals T2 and T3 while the midpoint of the winding sections is connected to the line terminal L2. The primary P of transformer TR is energized from a bridge type network consisting of four reactors RG1, RG2, RB1 and RB2, each having a premagnetizing control winding. The control windings of reactors RG1 and RG2 are series connected to the armature 3 of the pilot generator PG. The control coils of reactors RB1 and RB2 are series connected to a source of constant direct current voltage under control by a contact 19. The arrangement is such that the primary P lies across one of the diagonal branches of the reactor bridge while the terminals of the other diagonal are connected to line terminals L1 and L3, respectively.

Figure 10:
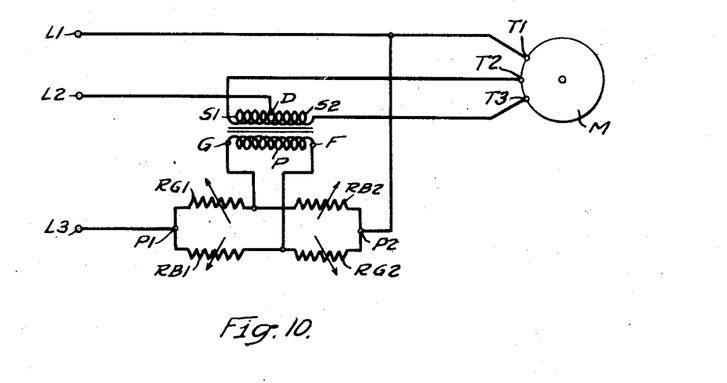
Fig. 10 shows a basic circuit diagram explanatory of the system according to Fig. 9.

The function of the control system according to Fig. 9 will be more easily understood from the explanatory scheme illustrated in Fig. 10. In this scheme the four reactors RG1, RG2, RB1 and RB2 are represented schematically by variable inductive resistors. The entire network comprising the transformer TR and the four reactors will be recognized as a double bridge. When all four reactors are unsaturated, the bridge is balanced. Consequently, the voltage drop across secondary S1 is equal and of opposite polarity to that across secondary S2. No voltage difference appears between motor terminals T2 and T3, so that the primary motor voltage is fully unbalanced and produces no torque. This condition exists when the pilot generator shown in Fig. 9 is at zero speed. At increases in speed of this generator, the reactors RG1 and RG2 reduce their impedance values simultaneously. Consequently, now referring to Fig. 10, the potential at point G approaches that of the line terminal L3 and the potential at point F approaches that of point P2 and hence that of line terminal L1. A voltage appears across primary P which unbalances the voltage ratio of the secondaries S1 and S2. Consequently, a three-phase energization is imposed on the motor and a torque of a given direction developed. On the other hand, when reactors RG1 and RG2 are unsaturated while reactors RB1 and RB2 are simultaneously saturated by the closure of contact 19 (Fig. 9), the impedance value of reactors RB1 and RB2 becomes a minimum. The potential at point G approaches now that of terminal L1 and the potential at point F that of terminal L3. Again, a voltage appears across primary P but this voltage has a reversed direction. The voltage ratio of the secondaries S1 and S2 becomes unbalanced in a direction opposite to that mentioned previously and the motor obtains three-phase excitation for developing a torque in the reverse direction. It will thus be seen that a control system in accordance with the principle of Fig. 9 or 10 is also applicable for achieving a control function in accordance with the invention.

Since those skilled in the art, on the basis of the foregoing, can readily devise other modifications without departing from the principles, objects and advantages of my invention, I wish the specification to be understood as illustrative other than in a limited sense.

I claim as my invention:

1. In a control system for alternating-current drives having a group of multiphase line terminals, an alternating-current motor with a corresponding group of multiphase terminals, and circuit means for interconnecting said two groups of terminals, said circuit means comprising an inductance device having two points connected with two terminals respectively of one of said groups and an intermediate point connected with one terminal of said other group, an impedance device connected across said inductance device and having an intermediate point connected with another terminal of said other group, and means for varying the ratio of the two component voltage drops, along one of said devices at the two sides of its intermediate point for varying the balance condition of the voltage at said motor terminals in order to thereby control the speed-torque characteristic of the motor.

2. In a control system for alternating-current drives having a group of multiphase line terminals, an induction motor with a corresponding group of multiphase terminals, and circuit means for interconnecting said two groups of terminals, said circuit means comprising two impedance devices disposed in parallel to each other and across two terminals of one of said groups, said devices having a point connected with two other terminals respectively of said other group and control means for varying the ratio of the two component voltage drops along one of said devices at the two sides of its intermediate point for varying the balance condition of the voltage at said motor terminals in order to thereby control the speed-torque characteristic of the motor.

3. In a control system for alternating-current drives having a group of multiphase line terminals, an induction motor with a corresponding group of multiphase terminals, and circuit means for interconnecting said two groups of terminals, said circuit means comprising a transformer connected across two terminals of one of said groups and having an intermediate point connected with a terminal of said other group, impedance means connected across said transformer and having a reference point connected with another terminal of said other group, and means for varying the ratio of the voltage drops along said device at the two sides of said reference point for varying the balance condition of the motor voltage.

4. In a control system for alternating-current drives having a group of multiphase line terminals, an induction motor with a corresponding group of multiphase terminals, and circuit means for interconnecting said two groups of terminals, said circuit means comprising an autotransformer connected across two terminals of one of said groups and having an intermediate point connected with a terminal of said other group, variable impedance means connected in parallel to said autotransformer and having an intermediate reference point connected with another terminal of said other group, and control means for varying said impedance device so as to control thereby the balance condition of the voltage at said motor terminals.

5. In a control system for alternating-current drives having a group of multiphase line terminals, an induction motor with a corresponding group of multiphase terminals, and circuit means for interconnecting said two groups of terminals, said circuit means comprising a transformer having two magnetically interlinked windings each having a tap connected with one and the same terminal of one of said groups, one of said windings being connected across two terminals of said other group, an impedance device connected across said other winding and having a point connected with another terminal of said other group, and control means for varying said impedance device so as to control thereby the balance condition of the voltage at said motor terminals.

6. In a control system for an alternating-current drive, a group of multiphase line terminals, an alternating-current motor with a corresponding group of multiphase terminals, and circuit means for interconnecting said two groups of terminals, said circuit means comprising an inductance device having spaced points connected with two terminals respectively of one of said groups and an intermediate point connected with one terminal of said other group, an impedance device connected across said inductance device and having an intermediate point connected with another terminal of said other groups, and speed responsive control means connected between said motor and one of said devices for varying, in accordance with the motor speed, the ratio of the voltage drops along said latter device at the two sides of its intermediate point thereby controlling the balance condition of the voltage at said group of motor terminals.

7. In a control system for alternating-current drives having a group of multiphase line terminals, an induction motor with a corresponding group of multiphase terminals, and circuit means for interconnecting said two groups of terminals, said circuit means comprising a transformer connected across two terminals of one of said groups and having an intermediate point connected with a terminal of said other group, impedance means connected across said transformer and having a reference point connected with another terminal of said other group, and speed responsive control means connected between said motor and impedance device for varying, in accordance with the motor speed, the ratio of the voltage drops along said latter device at the two sides of its intermediate point thereby controlling the balance condition of the voltage at said group of motor terminals.

8. In a three-phase system for controlling an alternating-current drive, the combination of a motor having three terminals, three current supply leads, means for connecting one of said leads with one of said terminals, reactance means connected across said two other terminals and having a tap connected with another one of said leads, impedance means connected in parallel to said reactance means and having a tap connected with said third lead, and means for varying the ratio of impedance relative to said tap of said impedance means so as to thereby control the balance condition of the voltage at said motor terminals.

9. In a three-phase system for controlling an alternating-current drive, the combination of a motor having three terminals, three current supply leads, means for connecting one of said leads with one of said terminals, reactance means connected across said two other terminals and having a tap connected with another one of said leads, impedance means connected in parallel to said reactance means and having a tap connected with said third lead, and speed responsive control means connected between said motor and said impedance means for varying, in dependence upon the motor speed, the ratio of impedance relative to said tap of said impedance means so as to thereby control the balance condition of the voltage at said motor terminals.

10. In a three-phase system for controlling an alternating current drive, the combination of a motor having three terminals, three current supply leads, means for connecting one of said leads with one of said terminals, a transformer having two magnetically interlinked windings each having a tap connected with one and the same lead, one of said windings being connected across two of said terminals, variable reactance means connected across said other winding and having a point connected with the third lead, and control means for varying said reactance means so as to change the balance condition of the voltage at said terminals.

11. In a control system for alternating-current drives having a group of multiphase line terminals, an induction motor with a corresponding group of multiphase terminals, and circuit means for interconnecting said two groups of terminals, said circuit means comprising a transformer connected across two terminals of one of said groups and having an intermediate point connected with a terminal of said other group, saturable reactor means connected across said transformer and having a point connected with another terminal of said other group, and premagnetizing control means connected with said reactor means for varying their reactance value in order to thereby change the balance condition of the voltage impressed on said motor terminals.

12. In a three-phase system for controlling an alternating-current drive, the combination of a motor having three terminals, three current supply leads, means for connecting one of said leads with one of said terminals, a transformer connected across said two other terminals and having a tap connected with another one of said leads, saturable reactor means connected across said transformer and having a point connected with another terminal of said other group, and premagnetizing control means connected with said reactor means for varying their reactance value in order to thereby change the balance condition of the voltage impressed on said motor terminals.

13. In a control system for alternating-current drives having a group of multiphase line terminals, an induction motor with a corresponding group of multiphase terminals, and circuit means for interconnecting said two groups of terminals, said circuit means comprising a transformer connected across two terminals of one of said groups and having an intermediate point connected with a terminal of said other group, saturable reactor means connected across said transformer and having a point connected with another terminal of said other group, and premagnetizing control windings magnetically associated with said reactor means, and a speed responsive voltage source controlled by said motor and connected to said control windings for varying the reactance of said reactor means in order to control the balance condition of the motor voltage in dependence upon the motor speed.

14. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, said impedance means being variable over a range which includes the balance condition of said network for substantially total unbalance of the motor voltage.

15. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, and control means for varying said impedance over a range including opposite unbalance conditions of said network for reversing the phase rotation of the voltage at the motor terminals.

16. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, said impedance means being variable over a range which includes the balance condition of said network for substantially total unbalance of the motor voltage, and control means connected with said motor for varying the impedance of said means in dependence upon the motor speed so as to adjust said total unbalance at a given subsynchronous speed value.

17. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, said impedance being variable over a range including opposite unbalance conditions of said network for reversing the phase rotation of the voltage at the motor terminals, and speed-responsive control means connected with said motor for reversing the motor torque in dependence upon the motor speed.

18. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, said impedance means comprising a saturable reactor having a control winding for varying the impedance value over a range which includes the bridge adjustment at which the motor voltage is substantially unbalanced for reducing the motor torque to substantially zero, and control means connected with said motor for energizing said control winding in dependence upon the motor speed so as to produce said torque at a given subsynchronous motor speed.

19. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, said impedance means comprising a saturable reactor having a control winding for varying the impedance value over a range which includes the bridge adjustment at which the motor voltage is substantially unbalanced for reducing the motor torque to substantially zero, and energizing circuit means connected to said control winding and controlled by said motor so as to produce said zero torque at substantially zero speed of said motor.

20. In a three-phase system for controlling an alternating-current drive, the combination of a motor having three terminals, three current supply leads, means for connecting one of said leads with one of said terminals, a bridge network having two diagonal branches connected across said remaining two leads and across said remaining two terminals respectively and containing four bridge branches, tapped transformer means in two adjacent ones of said bridge branches and impedance means in said remaining two branches, said impedance means comprising a saturable reactor having a control winding for varying the impedance value over a range which includes opposite unbalance conditions of said network for reversing the motor torque, and energizing circuit means connected to said control winding and controlled by said motor so as to produce said torque reversal at a given subsynchronous speed of said motor.

21. A three-phase alternating-current hoist control system comprising an induction motor having three terminals, three current supply leads, circuit means for connecting said leads to said terminals, said means comprising a bridge network having two diagonal branches connected across two of said leads and across two of said terminals respectively and containing four bridge branches, transformer means in two adjacent ones of said bridge branches and impedance means in said remaining two bridge branches, control means for varying said impedance means in dependence upon the speed of said motor so as to change the balance condition of said network in order to obtain a low-speed low-torque characteristic of said motor, and a master controller for selectively setting said motor for hoisting and lowering operation, said controller being connected with said circuit means so as to render said control means operative only for lowering operation.

22. A three-phase alternating-current hoist control system comprising an induction motor having three terminals, three current supply leads, circuit means for connecting said leads to said terminals, said means comprising a bridge network having two diagonal branches connected across two of said leads and across two of said terminals respectively and containing four bridge branches, transformer means in two adjacent ones of said bridge branches and impedance means in said remaining two bridge branches, said impedance means including a saturable reactor having a control winding, control means for energizing said control winding so as to change the balance condition of said network in order to obtain a low-speed low-torque characteristic of said motor, and a master controller for selectively setting said motor for hoisting and lowering operation, said controller being connected with said circuit means so as to render said control means operative only for lowering operation.

WILLIAM R. WICKERHAM.